US012610144B2

(12) United States Patent
Nilsson et al.

(10) Patent No.: US 12,610,144 B2
(45) Date of Patent: Apr. 21, 2026

(54) METHOD AND APPARATUS IN A CAMERA SYSTEM

(71) Applicant: Axis AB, Lund (SE)

(72) Inventors: Dennis Nilsson, Lund (SE); Jonas Hjelmström, Lund (SE); Johan Förberg, Lund (SE); Tor Nilsson, Lund (SE); Fangfang Yang, Lund (SE); Emil Manelius, Lund (SE); Peter K Jonsson, Lund (SE)

(73) Assignee: AXIS AB, Lund (SE)

( * ) Notice: Subject to any disclaimer, the term of this patent is extended or adjusted under 35 U.S.C. 154(b) by 42 days.

(21) Appl. No.: 18/946,481

(22) Filed: Nov. 13, 2024

(65) Prior Publication Data

US 2025/0203207 A1      Jun. 19, 2025

(30) Foreign Application Priority Data

Dec. 19, 2023    (EP) .................................... 23218053

(51) Int. Cl.
| | |
|---|---|
| *H04N 23/68* | (2023.01) |
| *G03B 5/00* | (2021.01) |
| *H04N 23/55* | (2023.01) |
| *H04N 23/67* | (2023.01) |

(52) U.S. Cl.
CPC ............. *H04N 23/687* (2023.01); *G03B 5/00* (2013.01); *H04N 23/55* (2023.01); *H04N 23/67* (2023.01); *G03B 2205/0007* (2013.01)

(58) Field of Classification Search
CPC .. G03B 5/00; G03B 2205/0007; H04N 23/55; H04N 23/67; H04N 23/687; H04N 23/683

USPC ...................................................... 348/208.11
See application file for complete search history.

(56) References Cited

U.S. PATENT DOCUMENTS

| | | | | |
|---|---|---|---|---|
| 8,314,865 | B2* | 11/2012 | Muukki .................. | H04N 23/68 |
| | | | | 348/208.4 |
| 8,928,761 | B2* | 1/2015 | Yumiki .................. | H04N 23/61 |
| | | | | 348/349 |
| 10,498,965 | B2* | 12/2019 | Fukai ........................ | G03B 3/10 |
| 10,897,574 | B2* | 1/2021 | Maede .................... | H04N 23/54 |
| 10,965,871 | B2* | 3/2021 | Song ...................... | H04N 23/63 |
| 10,983,363 | B2* | 4/2021 | O'Sullivan .......... | H04N 23/682 |
| 11,212,446 | B2* | 12/2021 | Nomura ............. | H04N 23/6811 |
| 12,342,065 | B2* | 6/2025 | Yang ........................ | H04N 23/71 |
| 12,532,061 | B2* | 1/2026 | Birnbaum .............. | H04N 23/57 |

(Continued)

OTHER PUBLICATIONS

Extended European Search Report, European Application No. 23218053. 9, dated May 16, 2024.

*Primary Examiner* — Pritham D Prabhakher
(74) *Attorney, Agent, or Firm* — Volpe Koenig

(57) ABSTRACT

A method for improving image quality of images captured by a camera system having an image sensor and implementing optical image stabilisation (OIS) comprises receiving image data representing an image captured by the camera system, receiving stabilisation position data from an OIS device in the camera system, the stabilisation position data indicating a position where an optical axis of the optical path intersects with the image sensor, and includes the step of applying a lens correction function to the received image data, wherein the application of the lens correction function is adjusted based on the received stabilisation position data, and outputting the corrected image data.

11 Claims, 3 Drawing Sheets

(56)  References Cited

U.S. PATENT DOCUMENTS

| | | | |
|---|---|---|---|
| 2010/0110217 A1* | 5/2010 | Shibuno | H04N 23/663 |
| | | | 348/222.1 |
| 2011/0149112 A1* | 6/2011 | Muukki | H04N 25/611 |
| | | | 348/E9.037 |
| 2012/0262590 A1 | 10/2012 | Yumiki | |
| 2017/0295321 A1 | 10/2017 | Fukai et al. | |
| 2020/0329199 A1* | 10/2020 | Nomura | H04N 23/6812 |
| 2020/0336664 A1 | 10/2020 | Maede et al. | |
| 2020/0404182 A1 | 12/2020 | Song et al. | |
| 2021/0088803 A1 | 3/2021 | O'Sullivan et al. | |
| 2022/0187509 A1* | 6/2022 | Taveniku | H04N 23/676 |
| 2023/0164420 A1 | 5/2023 | Yang et al. | |

* cited by examiner

METHOD AND APPARATUS IN A CAMERA SYSTEM

TECHNICAL FIELD

The present invention relates to a camera system implementing optical image stabilisation.

BACKGROUND

Cameras for capturing images, both still images and video, have for a long time experienced problems with blurred images due to camera movement or camera shake. The two classical remedies for this problem have been to either stabilise the camera by attaching it to a stable object, e.g. a tripod or some type of fixed camera mount, or by increasing the shutter speed. Another method to reduce the effect of camera movement in captured images introduced with digital cameras is to implement electronic image stabilisation in which the compensation for camera shake or movement is made to the image data, e.g., cropping, based on information from motion sensors, e.g., gyroscope. However, yet another way to mitigate the problem of blurry images due to camera movement or camera shake is to implement optical image stabilisation, OIS, in the camera or in interchangeable lenses for a camera.

There are generally two different OIS principles that are used for image stabilisation, one is lens-based optical image stabilisation and another is sensor-shift based optical image stabilisation, sometimes referred to as SIS. In a lens-based OIS system the position of at least one lens in the OIS system is adjusted in response to detected camera movement to cancel out the image blur attributed to the camera shake. In a sensor-shift based OIS system the position of the image sensor is adjusted in response to detected camera movement to cancel out the image blur attributed to the camera shake.

The quality of video and/or images captured by a shaking camera which is implementing an OIS system is thereby improved in relation to video and/or images captured by a shaking camera which is not implementing an OIS system. However, the video/image may in some cases include image artifacts resulting from capturing the video/image using the OIS-system.

In US2023/164420A1 an electronic device including a reflector, a lens assembly and an OIS-system is described. The OIS is achieved by moving the lens assembly and the position of the lens assembly is identified by a Hall sensor. Further, the electronic device includes a first memory for storing a first correction value for correcting shading by the lens assembly and a second memory for storing shading movement correction values, wherein each of the shading movement correction values has a different value depending on the position of the lens assembly.

From the above it is understood that there is room for improvements and the invention aims to solve or at least mitigate the above and other problems.

SUMMARY

One object of the present invention is to improve the image quality of images captured by camera systems implementing OIS.

The invention is defined by the appended independent claims. Additional features and advantages of the concepts disclosed herein are set forth in the description which follows, and in part will be obvious from the description, or may be learned by practice of the described technologies.

The features and advantages of the concepts may be realized and obtained by means of the instruments and combinations particularly pointed out in the appended claims. These and other features of the described technologies will become more fully apparent from the following description and appended claims, or may be learned by the practice of the disclosed concepts as set forth herein.

In a first aspect of the invention a method for improving image quality of images captured by a camera system having an image sensor and implementing optical image stabilisation (OIS), comprises receiving image data representing an image captured by the camera system, receiving stabilisation position data from an OIS device in the camera system, the stabilisation position data indicating a position where an optical axis of the optical path intersects with the image sensor, applying a lens correction function to the received image data, wherein the lens correction function is a function mapping corrections to be made to the captured image, wherein the application of the lens correction function is adjusted based on the received stabilisation position data, and wherein the adjustment of the application of the lens correction function includes shifting the application of the lens correction function spatially in correspondence with the stabilisation position data, and outputting the corrected image data. One advantage of such embodiments is that the image quality may be increased. This may be achieved due to the processing of the lens correction function is configured to adapt due to changes in spatial projection of the received light resulting from the OIS function.

The method may further include detecting movement of the camera system and moving at least one lens in the optical path in response to the detected movement. The moving of a lens in response to detected movement of the camera system is an effective method of stabilising a projected image on an image sensor when the camera is experiencing movement or camera shake.

The method may alternatively or in combination further include detecting movement of the camera system and moving the image sensor in response to the detected movement. The moving of the image sensor in response to detected movement of the camera system is an effective method of stabilising a projected image on an image sensor when the camera is experiencing movement or camera shake.

In some embodiments the stabilisation position data from the OIS includes an indication of the movement of the position where the optical axis intersects with the image sensor in relation to a normal state position, being the position where the optical axis intersects with the image sensor when the OIS is not active. One advantage this is that the stabilisation position indicates the variation from the normal state, which facilitates the spatial compensation in the lens correction function.

In some embodiments the stabilisation position data includes coordinates specifying the shift of the optical axis from the normal state position. In some embodiments the stabilisation position data includes the distance between the normal state position and the moved position.

According to yet some embodiments the lens correction function is a function mapping corrections to be made to the captured image and wherein the adjustment of the application of the lens correction function includes shifting the application of the lens correction function spatially in correspondence with the stabilisation position data. One advantage of this feature is that it facilitates the application of the spatially corrected lens correction function to the image data.

In some embodiments the lens correction function includes a lookup table including correction values. This may make decrease the time and/or processing power required for applying of the lens correction function to the image data.

According to some embodiments the lookup table includes less correction values than the number of pixels of the image and wherein the lens correction function further includes interpolating correction values for pixels not directly represented in the look up table. The advantage of such embodiments may be to reduce the required memory space.

In some embodiments the lens correction function includes a model representing corrections to be made to the captured image.

In yet some embodiments the method further comprises recording the received stabilisation position data for a plurality of images captured by the camera system.

In a second aspect of the invention a camera system comprises an image sensor, an optical image stabilisation (OIS) device, and a data processing system comprising a processor configured to perform the method presented in connection with the embodiments of the first aspect. The advantages relating to the second aspect of the invention corresponds to the advantages mentioned in connection of corresponding features in the first aspect of the invention.

In a second aspect of the invention a non-transitory computer-readable medium having stored thereon processor-executable instructions that, when executed by a processor, cause the processor to carry out the method according to any of the embodiments of the first aspect. The advantages relating to the third aspect of the invention corresponds to the advantages mentioned in connection of corresponding features in the first aspect of the invention.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Further, in the figures like reference characters designate like or corresponding parts throughout the several figures.

DETAILED DESCRIPTION

Hereinafter, certain embodiments will be described more fully with reference to the accompanying drawings. It will be apparent to those skilled in the art that various modifications and variations can be made without departing from the inventive concept. Other embodiments will be apparent to those skilled in the art from consideration of the specification and practice disclosed herein. The embodiments herein are provided by way of example so that this disclosure will be thorough and complete, and will fully convey the scope of the claims. If nothing else is stated, different embodiments may be combined with each other.

Figure 1:
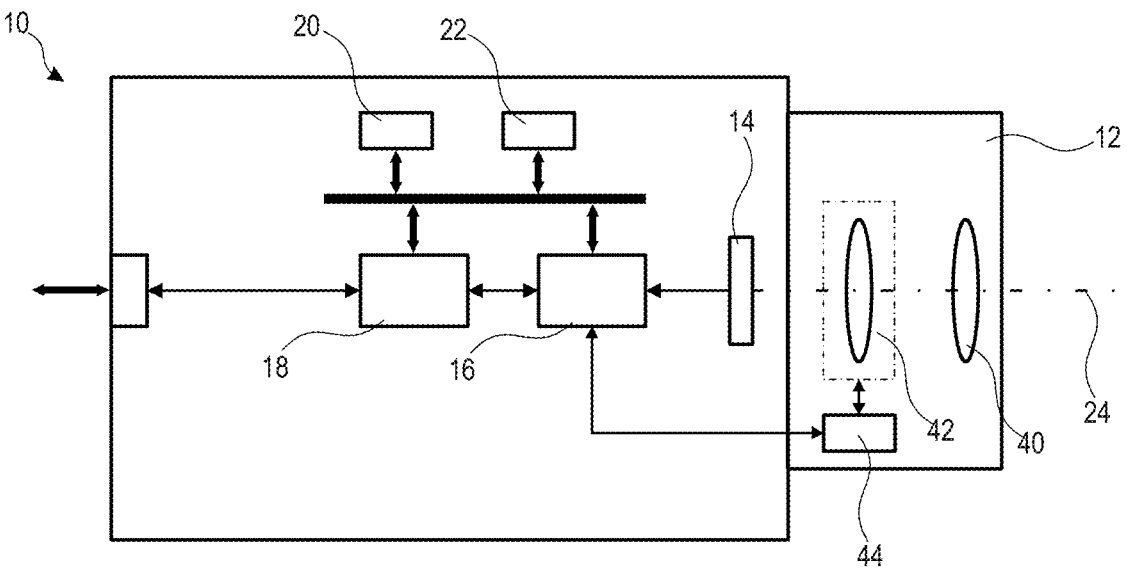
FIG. 1 is a schematic diagram over a camera system according to one embodiment of the invention.

Now referring to FIG. 1, in which a schematic view of a camera system 10 according to embodiments of the invention is depicted. The camera system 10 according to some embodiments comprises a lens system 12, an image sensor 14, an image processor 16, a CPU 18, volatile memory 20, and non-volatile memory 22.

The image sensor 14 may be any type of image sensor known by the skilled person for use in cameras. Some examples of image sensor types are CCD sensors and CMOS sensors, however the camera system may implement any image sensor known to the skilled person. The CPU 18 may be a processing unit running software for controlling the overall function of the camera. The volatile memory 20 may be used as a working memory and/or temporary memory for the CPU 18 and/or the image processor 14 when running programs controlling the camera and the image acquisition. The volatile memory 20 may for instance be a Random Access Memory (RAM), SRAM, DRAM. The non-volatile memory 22 may for instance be a Read Only Memory (ROM), PROM, EPROM, EEPROM, Mask ROM, Flash memory, Ferroelectric RAM, Magneto resistive RAM, Phase-change RAM, FeFET memory, RRAM memory, etc.

In embodiments of the invention the image processor 16 is arranged to, for instance, process the image data from the image sensor 14 and adjust for optical artifacts resulting from the lens system 12, e.g., various distortions and aberrations. In such lens corrections the image processor 16 may, for instance, remap the pixels to compensate for barrel distortion, pincushion distortion, moustache distortion, etc. and/or remap colours in pixels to compensate for chromatic aberration.

The lens system 12 being an optical image stabilisation lens system, OIS lens system, including at least a focusing lens system 40 for focusing the light captured onto the image sensor 14 along an optical axis 24 and a shift lens system 42. Under normal conditions the optical axis 24 is directed towards a predetermined position on the image sensor 14. This position is substantially in the centre of the image sensor 14. The lens system 12 further includes, in some embodiments, shift lens control unit 44 arranged to move at least one lens in the shift lens system 42 to compensate for shake of the camera system 10. The shift lens control unit 44 may include electronics for detecting movement of the camera system 10 or such electronics may be arranged in combination with other devices in the lens system 12 or the camera system 10 as a whole. The lens control unit may be arranged in the camera body 11 of the camera system 10, in the lens system 12, or in both the camera body 11 and the lens system 12. The lens system 12 of the camera system 10 may be interchangeable or fixed, i.e. built into the camera system 10.

The movement of the lens in the shift lens system 42 results in the optical axis 24 being moved in response to detected movement of the camera system 10. The purpose of the movement of the optical axis 24 is to make detection of light representing an object in a scene captured by the camera system 10 occur at substantially the same position on the image sensor 14 despite the movement of the camera system 10. The shift lens control unit 44 may also output a signal or values indicating the current position of the lens in the shift lens system 42, thereby indicating deviation of optical axis 24 on the image sensor 14 from the normal position. This data indicating the position of the lens in the shift lens system 42 is hereinafter referred to as shift position data.

Figure 2:
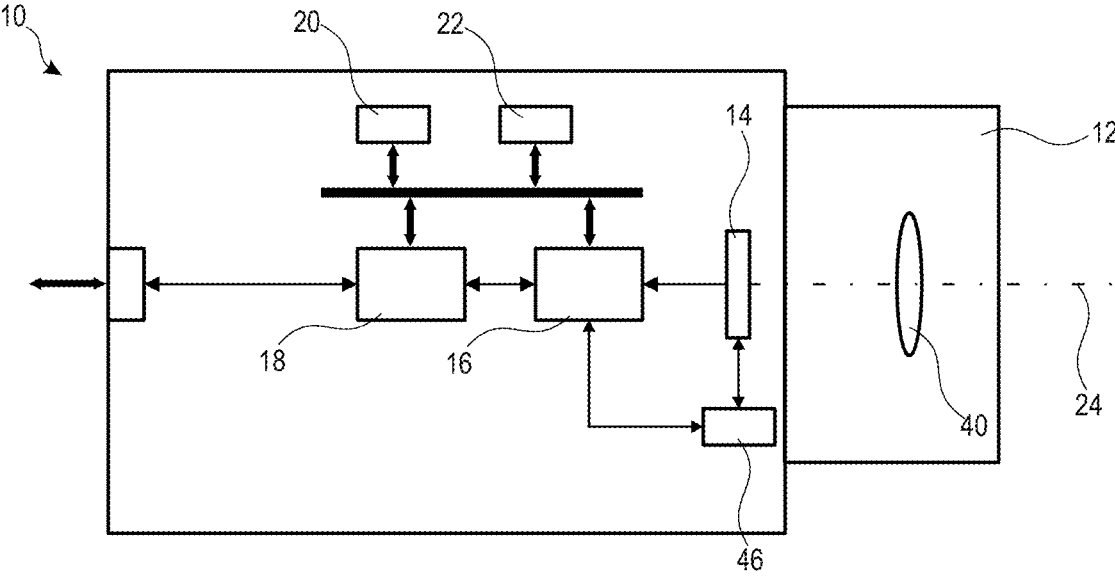
FIG. 2 is a schematic diagram over an alternative camera system according to one embodiment of the invention.

In FIG. 2 a schematic view of an alternative embodiment is shown. This embodiment is similar to the one described in connection with FIG. 1. One difference is that the image sensor 14 is moveably arranged for the purpose of OIS and that there is a sensor movement control unit 46 for controlling the movement of the image sensor 14 which is connected to the image sensor 14. The sensor movement control unit 46 and the movable image sensor 14 are parts of the OIS system in this embodiment. The sensor movement control unit 46 is configured to move the image sensor 14 in response to detection of movement of the camera system 10, e.g., camera shake, to compensate for shake of the camera system 10 when capturing images. The sensor movement control unit 46 may include electronics for detecting movement of the camera system 10 or such electronics may be arranged in other units in the camera system 10. The movement of the image sensor 14 in response to detected movement of the camera system 10 results in that the optical axis 24 pass through a position on the image sensor that differs from the position the optical axis passes through when the image sensor is in normal position, or normal state, and results in light representing an object in a scene captured by the camera system 10 being detected at substantially the same position on the image sensor 14 despite the movement of the camera system 10. The sensor movement control unit 46 may also output a signal or values indicating the current position of the image sensor 14, thereby indicating deviation of the position of the optical axis 24 on the image sensor 14 from the normal position of the optical axis 24, i.e., when the OIS is in normal state. This data indicating the position of the image sensor 14 is hereinafter referred to as shift position data.

Figure 3:
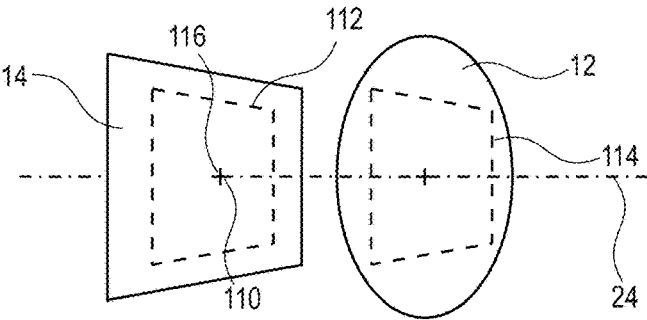
FIG. 3 is a schematic diagram over the relation between an image sensor and a lens system of a camera system in a normal state according to embodiments of the invention.

The inventors have realised that even if the image quality, e.g., the sharpness, of images captured using camera systems implementing OIS are increased in relation to a camera system not implementing OIS when the camera system is shaking, artifacts are still present in the image. At least some of these artifacts have been identified as resulting from the use of OIS in combination with compensation for lens artifacts performed, for instance, by the image processor 16 to the captured pixels. Normally the compensation for spatial lens artifacts is implemented as a compensation function or a lookup table that is configured to adjust pixels based on a pixel position in the image sensor. The function or lookup table is spatially related to positions on the image sensor 14 and are related to the specific optics 12 used. The functions or lookup tables may be determined from measuring the optical performance of the lens system 12 used. Further, the resulting compensating function or lookup table is designed to compensate for artifacts in images captured using the lens system 12 related to the function or the lookup table for a fixed setup, i.e., the image sensor 14 or the lens system 12 is not moving in relation to each other during the process of capturing images. Accordingly, in such fixed setup the optical axis 24 is directed onto the image sensor 14 at a normal state position 110, see FIG. 3. In FIG. 3 the dashed frame 112, lens area projection 112, indicates a lens area 114 representing the light that passes through the specific lens area 114 before arriving at the image sensor 14 at this area indicated by frame 112. Further, the optical axis 24 of the lens system 12 coincide with a centre position 116 of the image sensor 14. The centre position 116 of the image sensor 14 is not necessary the geometric centre of the image sensor, but may in some embodiments be the position on the image sensor 14 where the optical axis 24 impinge on the image sensor 14 when the camera system 10 and its lens system 12 is in a normal state, i.e., in a state when the optical axis is not moved around. This normal state center position 116 and the geometric centre do not have to coincide exactly but may differ by a value within in the range ±0.2 mm, which in some cameras corresponds to a value within the range ±100 pixels. These values are, however, merely examples illustrating an order of magnitude for the less skilled person get a notion of the context of the present invention.

Figure 4:
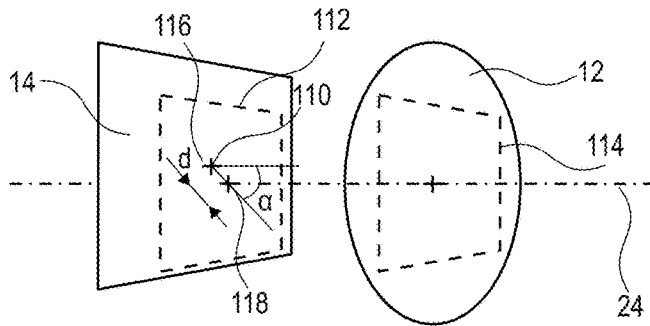
FIG. 4 is a schematic diagram over the relation between an image sensor and a lens system of a camera system in a camera shake compensating state according to embodiments of the invention.

When the camera system 10, including the image sensor 14 and the lens system 12, is shaking, the OIS system is activated and, depending on implementation, moves the image sensor 14 or the shift lens 42 in order to compensate for the shake in an effort of projecting static objects in the captured image at the same position on the image sensor during an exposure. Referring to FIG. 4, this compensation, by moving the shift lens 42 or the image sensor 14, results in the optical axis 24 of the lens system 12 landing on the image sensor 14 at a different position than when the camera system 10 is the normal state without the OIS system moving the shift lens 42 or the image sensor 14. Stabilisation position data may be provided as the difference between the position 110 of the optical axis 24 on the sensor when the camera system is in the normal state and the position 118 of the optical axis on the image sensor 14 when the OIS system has compensated for camera movement or camera shake is indicated by polar coordinates, e.g., a distance d and an angle α or by cartesian coordinates, e.g., Δx and Δy. According to some embodiments such deviation values may be produced by the shift lens control unit 44 or the sensor movement control unit 46. Alternative, these units 44, 46, may produce absolute values of the position of the optical axis. In some embodiments these values are values indicating the movement of a shift lens in the shift lens system or the image sensor 14, such values correlate to the movement of the position of the optical axis 24 landing on the image sensor 14.

Figure 5:
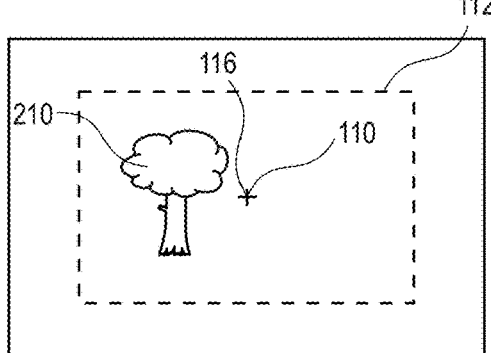
FIG. 5 shows a projection onto the image sensor via the lens system when the camera system is in a normal state.
Figure 6:
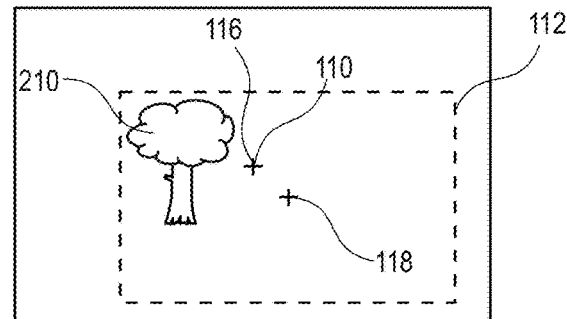
FIG. 6 shows a projection onto the image sensor via the lens system when the camera system is in a camera shake compensation state.

Now referring to FIGS. 5 and 6, depicting a schematic image of an object 210, in this case a tree, being projected via the lens system 12 onto the image sensor 14. FIG. 5 depicts the image captured by the image sensor 14 when the OIS system is in the normal state, i.e. no movement of either of the shift lens system 42 or the image sensor 14 due to camera shake or camera movement. As previously mentioned, the optical axis 24 is directed towards and impinge on the image sensor at a position 110 at, substantially, the centre position 116 of the mage sensor 14. In FIG. 6 the position 118 of where the optical axis land on the image sensor is shifted in response to camera shake or camera movement. The position of the object 210 on the image sensor is substantially the same position as when the camera system does not experience camera shake or camera movement. Hence, the shift lens system 42 or the image sensor 14 has been moved to compensate for the movement of the camera in an effort to keep the object projected 210 at the same position on the image sensor even if the camera is directed in a different direction than previously. The shifting of the position of where the optical axis 24 land on the image sensor 14 also results in that the lens area projection 112 is shifted on the image sensor 14. Hence, lights passing through the lens at a specific position on the lens and being projected to a position on the image sensor 14 when the camera system 10 is in the normal state will be projected to another position on the image sensor due to the movement in the shift lens system 42 or of the image sensor 14.

Lens correction functions are, as briefly discussed previously, configured to correct for artifacts from the lens system, for example spatial artifacts such as barrel distortion, pincushion distortion, moustache distortion, etc. and/or to compensate for chromatic aberration. There are a plurality of methods for providing such lens correction functionality. In some methods a correction function is represented by mathematical expressions, in some a correction function is represented by a lookup table, and in some a correction function is represented by a correction matrix. A combination of these types of correction functions may also be used. The lens correction function is in most cases modelled or measured for a camera system 10 being in normal state in view of compensation for camera shake, i.e., the lens correction function is provided for a situation where no OIS is compensating for camera system movement or when it is not activated. The lens correction function is varying over the area of the image sensor 14, e.g., the function depends position on the sensor. One reason for this is that distortions and/or artifacts in the lens system 12 varies depending on where in a lens plane the light passes through the lens system 12. In some lenses the distortions and/or artifacts varies with the distance from the centre of the lens system axis, i.e., the optical axis 24. Therefore, an image captured when the OIS is activated and the optical axis 24 is shifted on the image sensor 14 and corrected using a classical lens correction function will not correctly compensate for the artifacts and/or aberration as the function will not apply the corrections to the right pixels. In order to solve this problem and increase the image quality for images captured using active OIS the lens correction function is configured to receive the stabilisation position data and applying this stabilisation position data to the lens correction function. Thereby, adapting the lens correction function to make the proper adjustments to the pixels captured by the image sensor. Another way to describe the operation of applying the lens correction function according to embodiments of the invention is that the lens correction function is designed to operate on the pixels captured when the camera is in normal state and the optical axis is projected substantially in the centre of the image sensor, or at least in a normal state position on the image sensor. The optical characteristics of the lens system is spatially related to the optical axis and the position where it is projected on the image sensor. Therefore, when the position of the projected optical axis on the sensor is moved due to use of OIS, the lens correction function is advantageously moved correspondingly in order to adjust the pixels correctly.

Figure 7:
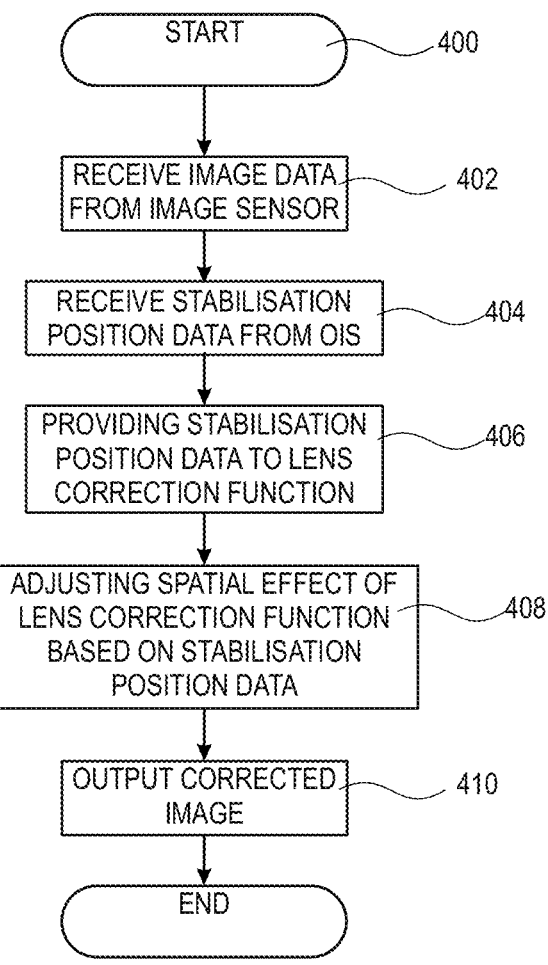
FIG. 7 is a flowchart of a method according to the invention according to embodiments of the invention.

Now referring to FIG. 7, a method for designed to increase the image quality based on the previously described ideas is described, 400. The method may be performed in a camera system 10 as previously described. The image processor 16 receives image data from the image sensor 14, step 402. The image data processor receives stabilisation position data from an OIS device, step 404, e.g., the shift lens control unit 44, the sensor movement control unit 46, or another device keeping track of the movement of the optical axis on the image sensor 14. The stabilisation position data then is provided to the lens correction function, step 406, for adjusting the spatial effects of the correction function to the captured image data. The received image data is then corrected based on the adjusted lens correction function, step 408, and the corrected image is outputted.

In embodiments of the invention the position of the projected optical axis may be moved during the exposure of the image, i.e. the stabilisation position data during the time period the image sensor registers light for a single image may vary. The stabilisation position data used in the lens correction function for adjusting the spatial effect may then be an average position over the exposure time. In some embodiments individual stabilisation position data is provided for each line of pixels, for groups of lines of pixels, or for each individual pixel.

The various embodiments described above are provided by way of illustration only and should not be construed to limit the invention. Those skilled in the art will readily recognize various modifications and changes that may be made to the present invention without following the example embodiments and applications illustrated and described herein, and without departing from the scope of the present disclosure and the claimed invention.

The invention claimed is:

1. A method for improving image quality of images captured by a camera system having an image sensor and implementing optical image stabilisation (OIS), the method comprising:

receiving image data representing an image captured by the camera system, receiving stabilisation position data from an OIS device in the camera system, the stabilisation position data indicating a position where an optical axis of the optical path intersects with the image sensor, applying a lens correction function to the received image data, wherein the lens correction function is a function mapping corrections to be made to the captured image, wherein the application of the lens correction function is adjusted based on the received stabilisation position data, and wherein the adjustment of the application of the lens correction function includes shifting the application of the lens correction function spatially in correspondence with the stabilisation position data, outputting the corrected image data, wherein the lens correction function includes a lookup table including correction values, and wherein the lookup table includes less correction values than the number of pixels of the image and wherein the lens correction function further includes interpolating correction values for pixels not directly represented in the lookup table.

2. The method according to claim 1, further including detecting movement of the camera system and moving at least one lens in the optical path in response to the detected movement.

3. The method according to claim 1, further including detecting movement of the camera system and moving the image sensor in response to the detected movement.

4. The method according to claim 1, wherein the stabilisation position data from the OIS includes an indication of the movement of the position where the optical axis intersects with the image sensor in relation to a normal state position, being the position where the optical axis intersects with the image sensor when the OIS is not active.

5. The method according to claim 4, wherein the stabilisation position data includes coordinates specifying the shift of the optical axis from the normal state position.

6. The method according to claim 4, wherein the stabilisation position data includes the distance between the normal state position and the moved position.

7. The method according to claim 1, wherein the shifting the application of the lens correction function spatially in correspondence with the stabilisation position data includes moving the lens correction function in correspondence with the movement of the projected optical axis on the sensor due to OIS.

8. The method according to claim 1, wherein the lens correction function includes a model representing corrections to be made to the captured image.

9. The method according to claim 1, further comprising recording the received stabilisation position data for a plurality of images captured by the camera system.

10. A camera system comprising:

an image sensor, an optical image stabilisation (OIS) device, and a data processing system comprising a processor configured to perform a method for improving image quality of images captured by the image sensor and implementing OIS, the method comprising:

receiving image data representing an image captured by the camera system, receiving stabilisation position data from an OIS device in the camera system, the stabilisation position data indicating a position where an optical axis of the optical path intersects with the image sensor, applying a lens correction function to the received image data, wherein the lens correction function is a function mapping corrections to be made to the cap-tured image, wherein the application of the lens correction function is adjusted based on the received stabilisation position data, and wherein the adjustment of the application of the lens correction function includes shifting the application of the lens correction function spatially in correspondence with the stabilisation position data, outputting the corrected image data, wherein the lens correction function includes a lookup table including correction values, and wherein the lookup table includes less correction values than the number of pixels of the image and wherein the lens correction function further includes interpolating correction values for pixels not directly represented in the lookup table.

11. A non-transitory computer-readable medium having stored thereon processor-executable instructions that, when executed by a processor, cause the processor to carry out a method for improving image quality of images captured by a camera system having an image sensor and implementing optical image stabilisation (OIS), the method comprising:

receiving image data representing an image captured by the camera system, receiving stabilisation position data from an OIS device in the camera system, the stabilisation position data indicating a position where an optical axis of the optical path intersects with the image sensor, applying a lens correction function to the received image data, wherein the lens correction function is a function mapping corrections to be made to the captured image, wherein the application of the lens correction function is adjusted based on the received stabilisation position data, and wherein the adjustment of the application of the lens correction function includes shifting the application of the lens correction function spatially in correspondence with the stabilisation position data, outputting the corrected image data, wherein the lens correction function includes a lookup table including correction values, and wherein the lookup table includes less correction values than the number of pixels of the image and wherein the lens correction function further includes interpolating correction values for pixels not directly represented in the lookup table.

*   *   *   *   *